United States Patent
Manhire

(10) Patent No.: US 10,946,823 B2
(45) Date of Patent: Mar. 16, 2021

(54) LINKAGE FOR IMPROVED DIAGNOSTICS AND KINEMATIC ASSEMBLY

(71) Applicant: Magna Exteriors Inc., Concord (CA)

(72) Inventor: Jeffrey B. Manhire, Rochester, MI (US)

(73) Assignee: MAGNA EXTERIORS, INC, Concord (CA)

( * ) Notice: Subject to any disclaimer, the term of this patent is extended or adjusted under 35 U.S.C. 154(b) by 0 days.

(21) Appl. No.: 16/770,661

(22) PCT Filed: Jan. 30, 2019

(86) PCT No.: PCT/US2019/015848
§ 371 (c)(1),
(2) Date: Jun. 8, 2020

(87) PCT Pub. No.: WO2019/152520
PCT Pub. Date: Aug. 8, 2019

(65) Prior Publication Data
US 2020/0391685 A1 Dec. 17, 2020

Related U.S. Application Data

(60) Provisional application No. 62/623,874, filed on Jan. 30, 2018.

(51) Int. Cl.
*B60K 11/08* (2006.01)
*B60R 19/52* (2006.01)

(52) U.S. Cl.
CPC ............ *B60R 19/52* (2013.01); *B60K 11/085* (2013.01); *B60R 2019/525* (2013.01)

(58) Field of Classification Search
CPC .. B60R 19/52; B60R 2019/525; B60K 11/085
USPC ......................................................... 296/115
See application file for complete search history.

(56) References Cited

U.S. PATENT DOCUMENTS

| 8,646,552 B2 * | 2/2014 | Evans .................... B60R 19/18 180/68.1 |
| 9,031,748 B2 * | 5/2015 | Sakai ................... B60K 11/085 701/49 |
| 2010/0071977 A1 | 3/2010 | Ritz et al. |
| 2017/0106741 A1 | 4/2017 | Shaw et al. |
| 2017/0225560 A1 * | 8/2017 | Klop ....................... F01P 11/10 |
| 2018/0304843 A1 * | 10/2018 | Vacca ................. B60K 11/085 |
| 2020/0148147 A1 * | 5/2020 | Totsuka ................ B60K 11/08 |

(Continued)

FOREIGN PATENT DOCUMENTS

| JP | 2007001503 A * | 1/2007 |
| WO | 2012110203 A1 | 8/2012 |
| WO | 2019073422 A1 | 4/2019 |

OTHER PUBLICATIONS

Notification of Transmittal of the International Search Report for International Application No. PCT/US2019/015848, dated May 29, 2019.

*Primary Examiner* — Pinel E Romain
(74) *Attorney, Agent, or Firm* — Warn Partners, P.C.

(57) ABSTRACT

A kinematic assembly with a plurality of moveable members moveable in synchronized movement by way of a connection rod wherein the connection rod is configured to buckle if one of the members becomes somehow disengaged for providing a tactile indication of a fault condition.

21 Claims, 13 Drawing Sheets

(56) References Cited

U.S. PATENT DOCUMENTS

2020/0223306 A1* 7/2020 Gerber ................ B60K 11/085
2020/0346538 A1* 11/2020 Lindberg ................ B29C 48/09

* cited by examiner

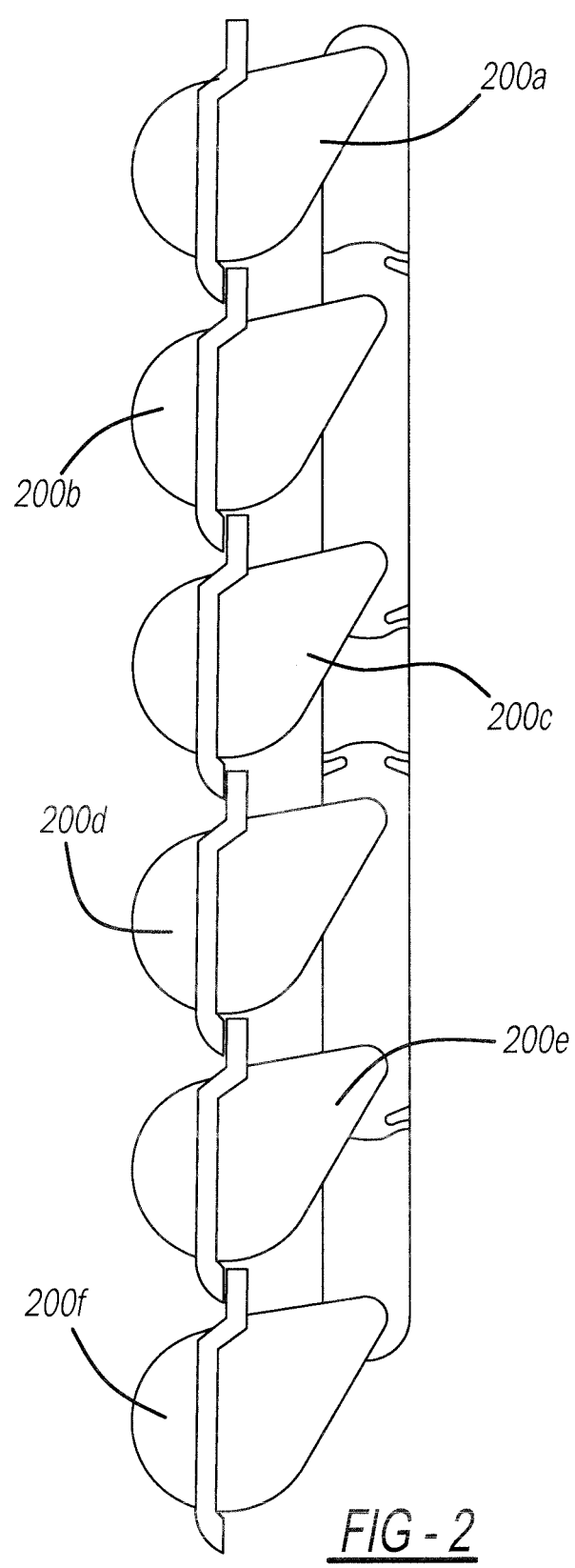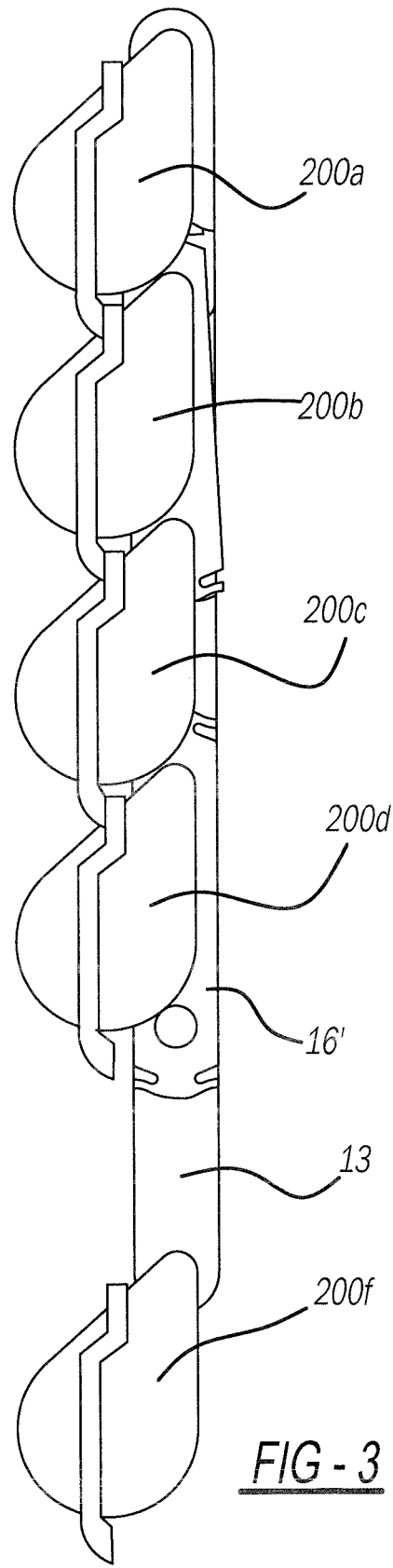

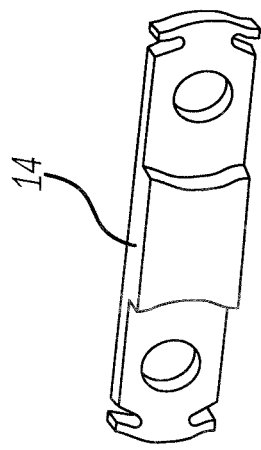
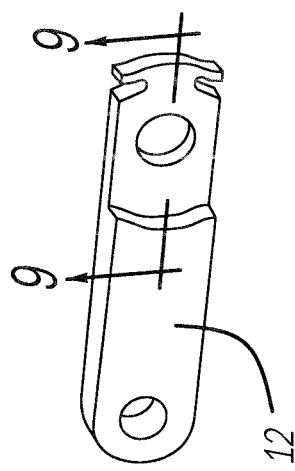
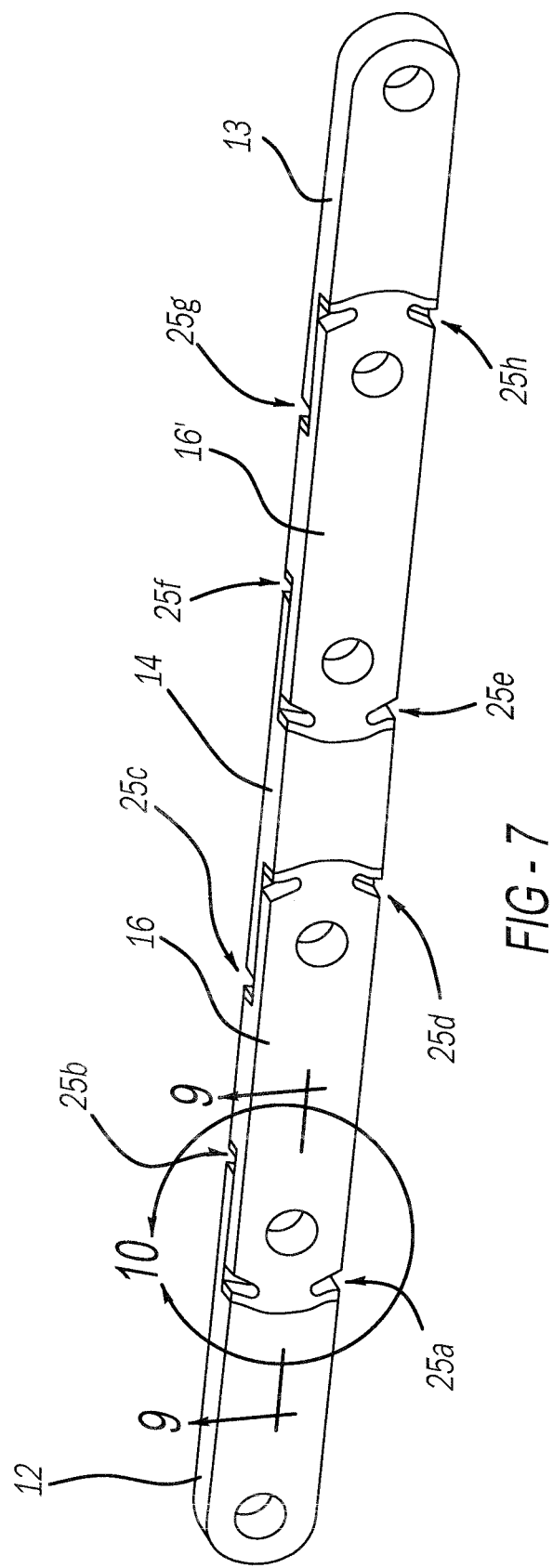

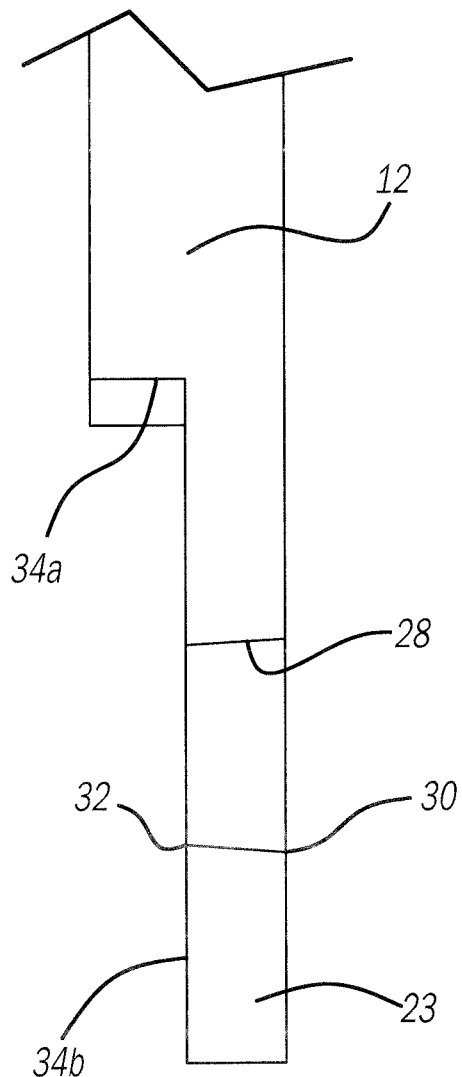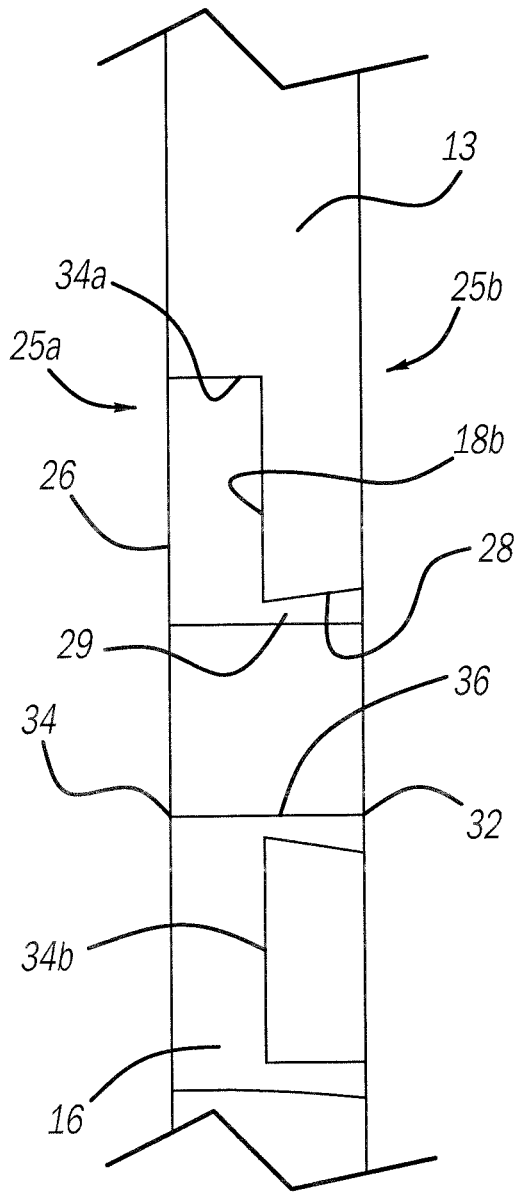

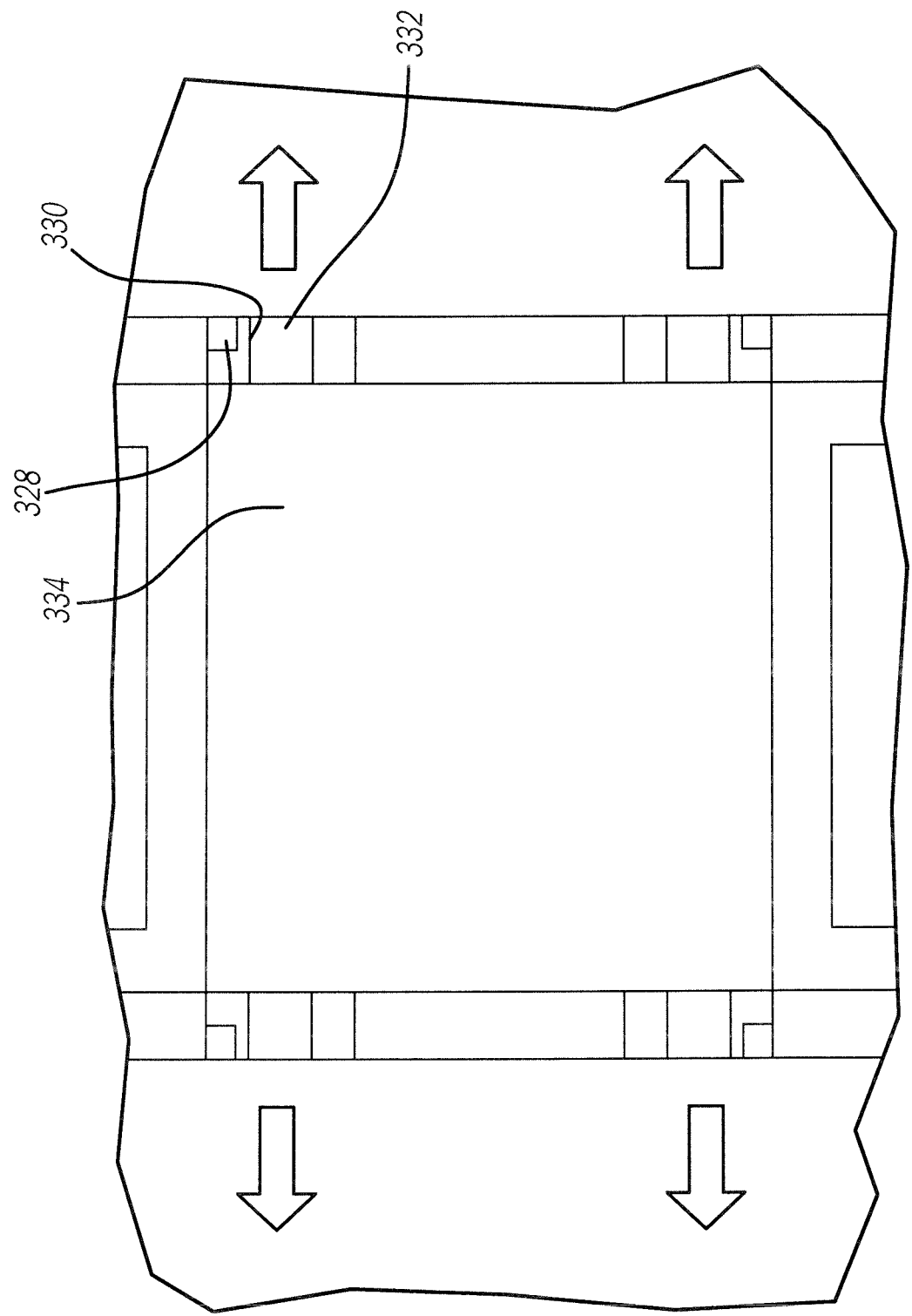

LINKAGE FOR IMPROVED DIAGNOSTICS AND KINEMATIC ASSEMBLY

FIELD OF THE INVENTION

The present invention relates to a kinematic connection rod assembly for providing improved diagnostics on active aerodynamic vehicle systems such as an active grille shutter assembly.

BACKGROUND OF THE INVENTION

Current Active Grille Shutter (AGS) assemblies do not provide adequate monitoring capability if components are missing. Aerodynamic performance may be degraded without knowledge by the driver in the event vanes are broken or missing. It is a goal in the art in the present invention to design an improved linkage, which uses two-shot molding to provide better ability to monitor the functionality of all of the AGS components.

Typical AGS assemblies are a series of connected links, controlled by an actuator; the linkage is generally a single piece connected to all of the vanes together. Due to the use of a single component, if some of the vanes are missing, the actuator cannot sense a difference, and a damaged assembly may go unnoticed. By making the linkage as a two-shot component, which can buckle if any vane is missing, the system can sense an error and alert the vehicle driver or mechanic.

SUMMARY OF THE INVENTION

In the present invention there is provided a kinematic connection rod assembly that includes a plurality of first body portions formed of a first material and a plurality of second body portions formed of a second material different from the first material. The use of two different materials provides a weak bond between first body portion and the second body portion that gives the kinematic connection rod assembly some degree of stiffness. Between the first body portion and second body portion there is provided a plurality of frangible connections. The plurality of first body portions and the plurality of second body portions are moveable in a synchronized movement during normal operation, and upon a fault condition one or more of the plurality of first body portions and one or more of the second body portions buckles at one or more of the plurality of frangible connections upon failure of the one or more of the plurality of frangible connections. This failure provides a tactile indication of the fault condition that can be sensed by the actuator and is visible to the naked eye.

This invention changes the way the linkage works, from a single-molded piece, to a plurality of two-shot sub-components, which are frangible—they have the ability to move on each other, if any of the mating components are missing. This frangibility provides the opportunity for improved monitoring of the entire kinematic assembly.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a side plan view of the kinematic connection rod assembly of the present invention in operation using the frangible linkage for detecting a missing blade.

FIG. 3 is a side plan view of the kinematic connection rod assembly of the present invention in operation using the frangible linkage for detecting a missing blade.

FIG. 6 is a side perspective view of the first shot components for forming the kinematic connection rod assembly of the present invention.

FIG. 7 is a side perspective view showing the member formed by a second shot for completing the kinematic connection rod assembly made in accordance with the present invention.

FIG. 8 is a broken swag side plan cross-sectional view taken along line 8-8 of FIG. 6 showing the pivot dimensions in the first shot.

FIG. 9 is a broken swag side plan cross-sectional view taken along line 9-9 of FIG. 7 showing the molded second piece in place in the assembly.

FIG. 11a is a schematic front perspective view of a completed alternate embodiment of the present invention with second body portions formed after a second shot of molten material has been injected.

FIG. 12 is a front perspective view of the finished two-shot molded connecting arm of FIG. 11a.

FIG. 14 is a back side perspective view of an alternate embodiment showing offset links providing a bridge between two connections and assemblies.

FIG. 15 is a plan back side sectional view demonstrating that the draft is set up so both sides of the two-sided bridged assembly are only pulled to the outboard side to simplify tooling.

DETAILED DESCRIPTION OF THE PREFERRED EMBODIMENTS

The following description of the preferred embodiment(s) is merely exemplary in nature and is in no way intended to limit the invention, its application, or uses.

Figure 16:
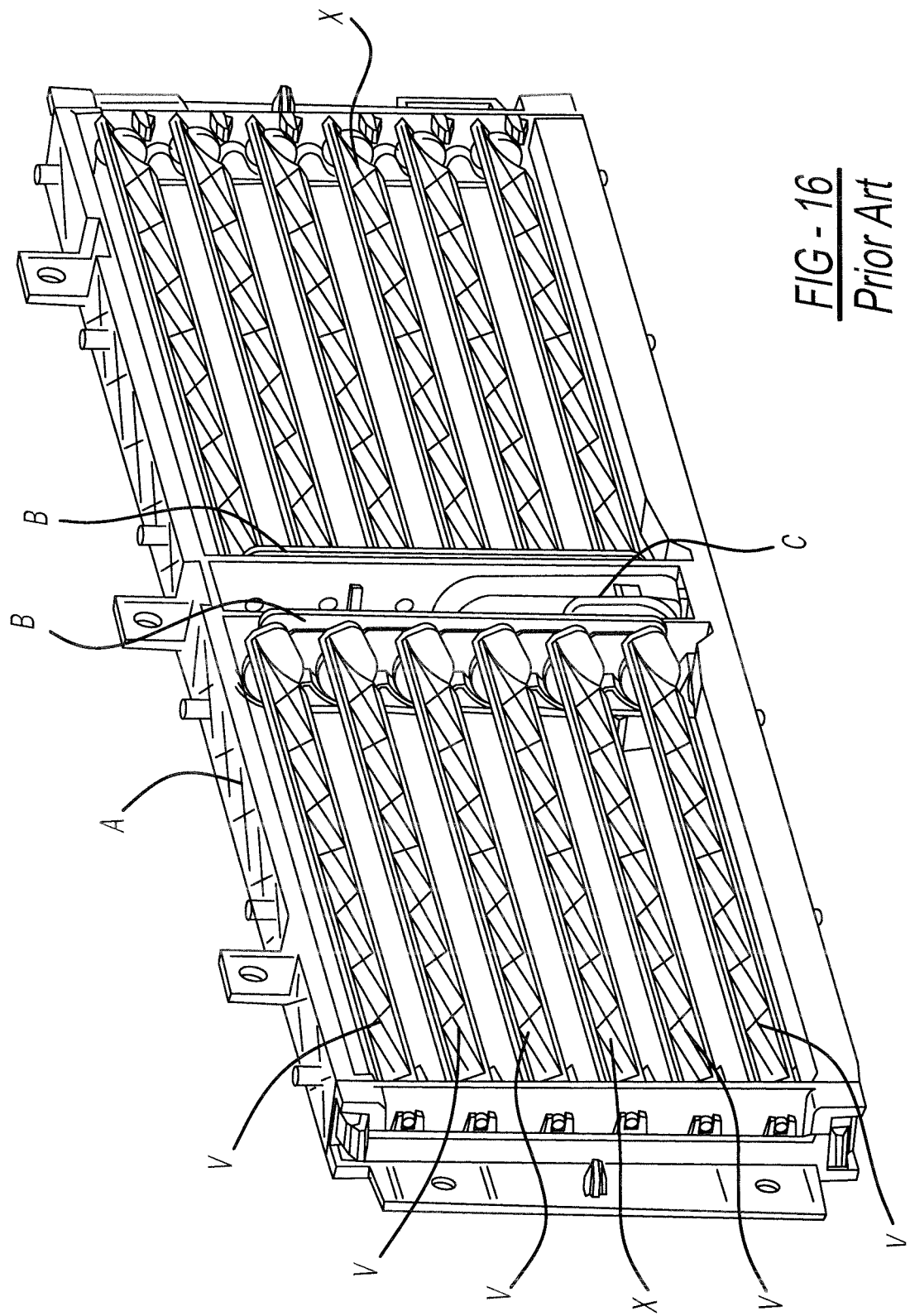
FIG. 16 is a prior art back side perspective view of an active grill assembly showing a prior art type connecting rod.
Figure 17:
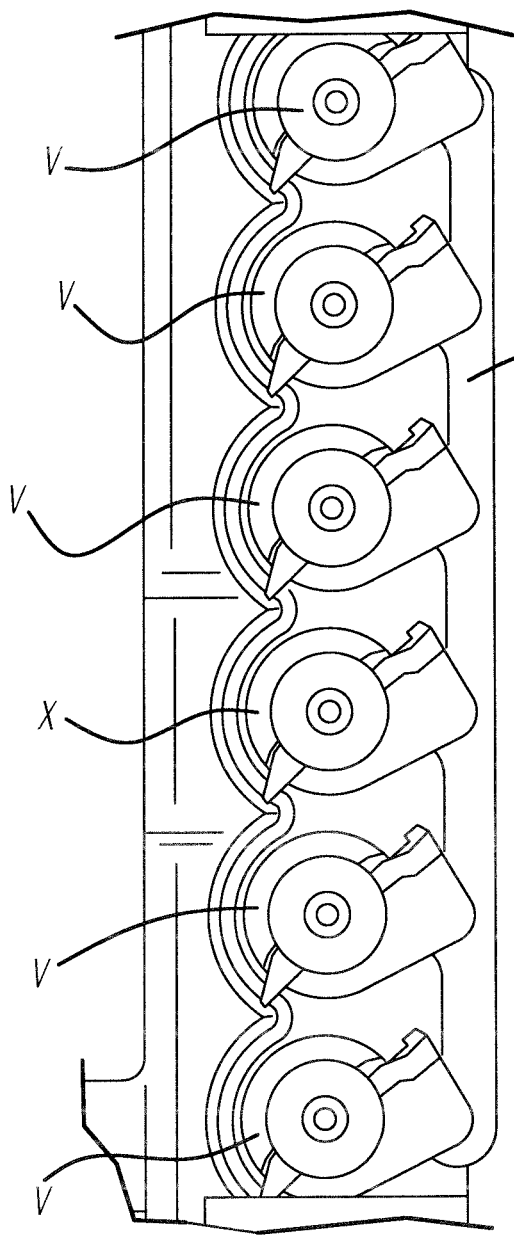
FIG. 17 is a prior art side perspective view showing the connecting rod of FIG. 16 actuating all the vanes of the assembly.
Figure 18:
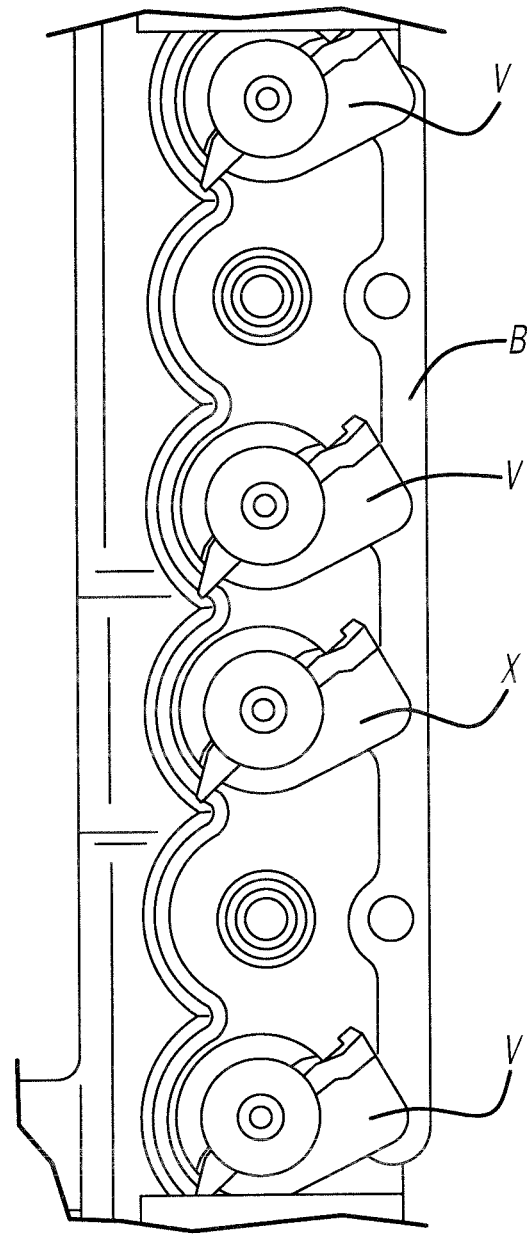
FIG. 18 is a prior art side perspective view showing the connecting rod of FIG. 16 actuating the vanes with two of the vanes missing.

Referring to FIGS. 16-18 a prior art active grill assembly is shown using a one piece control rod. Typically these assemblies include a frame A. A series of vanes V are pivotally connected in the frame A and are connected to a solid one piece control rod B. The actuator C is connected to actuate a control vane X movement of the control vane X which moves the other vanes by the control rod B as seen in FIG. 17. If one of the vanes is missing as shown in FIG. 18 the entire unit functions the same as if all of the vanes are there and there is no indication of a problem. A kinematic control rod assembly 10, shown in FIGS. 1-5 and 19 of the present invention is designed to buckle if one of the vanes is missing.

Figure 1:
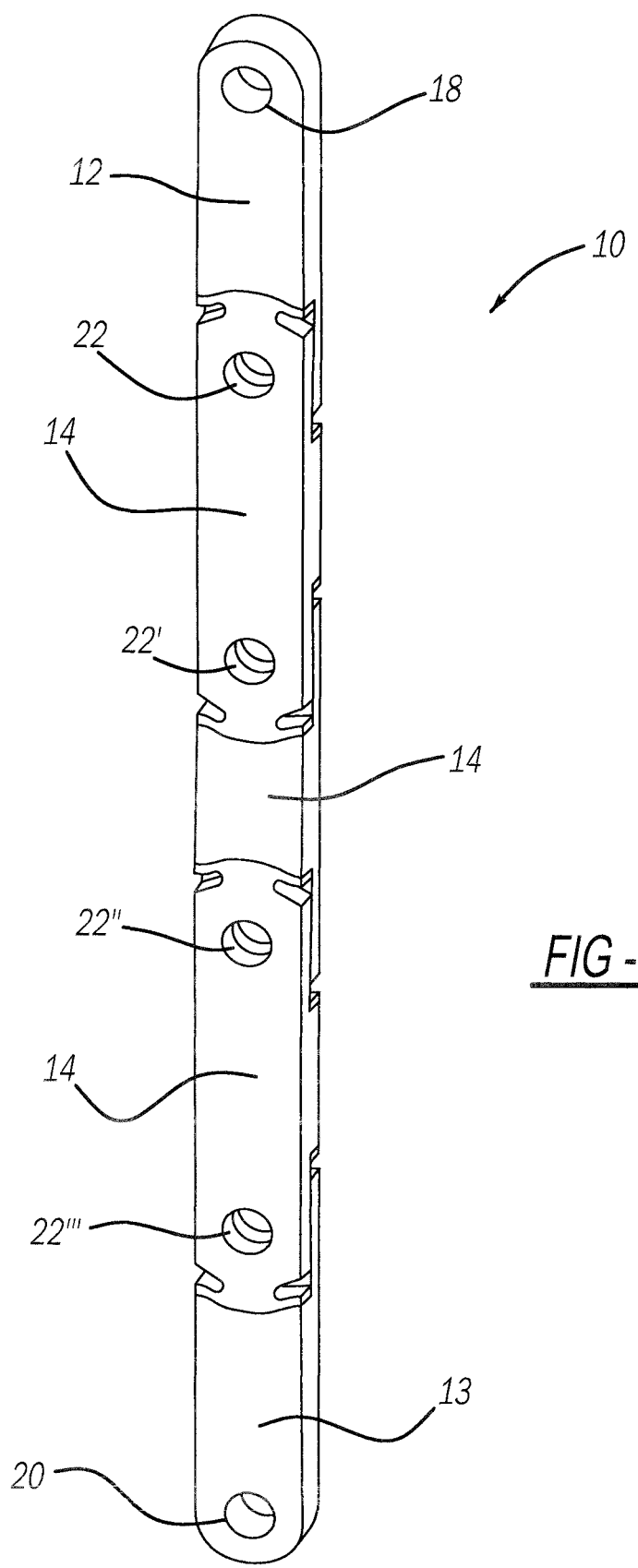
FIG. 1 is a side perspective view of the kinematic connection rod assembly of the present invention.

Referring more particularly to FIG. 1, the kinematic connecting rod assembly 10 which includes one or more first body portions that include first end portion 12, second end portion 13, middle portion 14 and a plurality of second body portions 16, 16' formed independently in a two shot molding process to form an integral actuation rod that acts as a one piece member when all the actuate-able members are present and that is frangible if a pivot-able member is missing or broken. The kinematic connecting rod assembly has a series of openings including a first end opening 18, second end opening 20, and middle portion openings 22, 22', 22''', 22''''. While a set number of openings and first and second body portions is shown, it is within the scope of the invention for a greater or lesser number of openings and first and second body portions to be implemented depending on the needs of a particular application. For example it might be necessary to add body portions or apertures where more vanes are used in a particular grill assembly. In other applications the vanes might be larger or have less pivot connections, thereby reducing the number of openings to be included on the kinematic connecting rod assembly 10.

Figure 4:
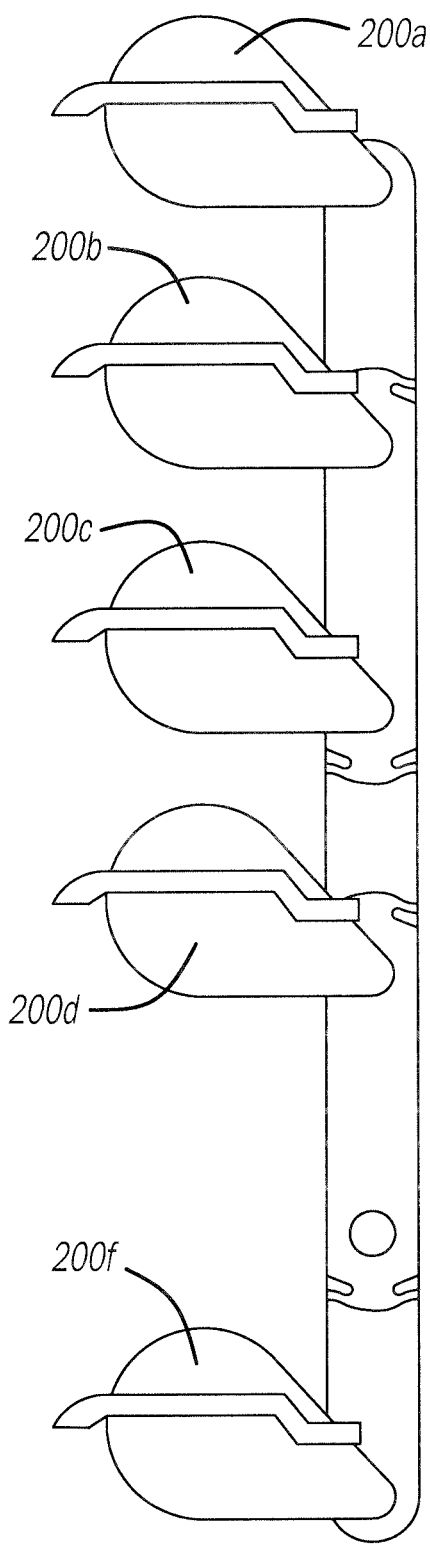
FIG. 4 is a side plan view of the kinematic connection rod assembly of the present invention in operation using the frangible linkage for detecting a missing blade.
Figure 5:
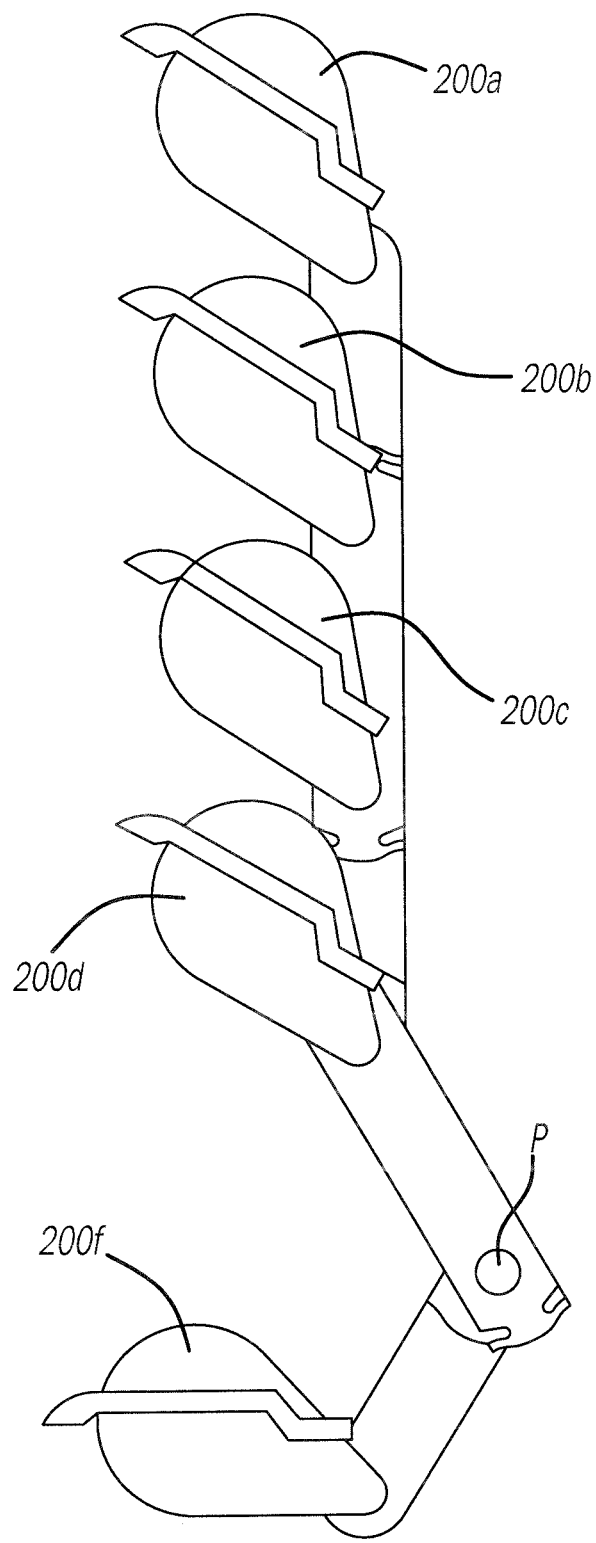
FIG. 5 is a side plan view of the kinematic connection rod assembly of the present invention in operation using the frangible linkage for detecting a missing blade.

Referring to FIGS. 2-5, a series of vanes 200 a-f are linked with the kinematic connecting rod assembly 10 through a respective one of the first end opening 18, second end opening 20, and middle portion openings 22, 22', 22''', 22''''. One of the series of vanes is a control vane 200a that is driven by an actuator (not shown) to provide synchronous movement of the other vanes 200b-f through the kinematic connecting rod assembly 10. The control vane 200a is depicted as being connected to the first end portion 12, however, it is within the scope of this invention for the control vane to be any one of the series of vanes 200a-f connected to different portions of the kinematic control rod 10. The control vane 200a is actuated by way of either a linear actuator or a rotary actuator. The actuator rotates the driven vane. When all of the vanes 200a-f are present the kinematic connecting rod assembly 10 will function the same as a single piece linkage since the each cane 200 a-f pivots and keeps all the portions of the kinematic connecting rod assembly 10 in position, as shown in FIG. 2. However, FIGS. 3-5 shows that if one of the vanes, such as vane 200c, is missing the connection between the second end portion 12 and second body portion 16' will buckle at the pivot point P because the continuity of the linkage is lost and will allow the actuator (shown in FIG. 19) to over-travel and the vanes 200a-d, 200f to rotate too far. The buckling is easily sensed by the actuator circuitry or is a visible indication that something is wrong or damaged in the system.

Figure 19:
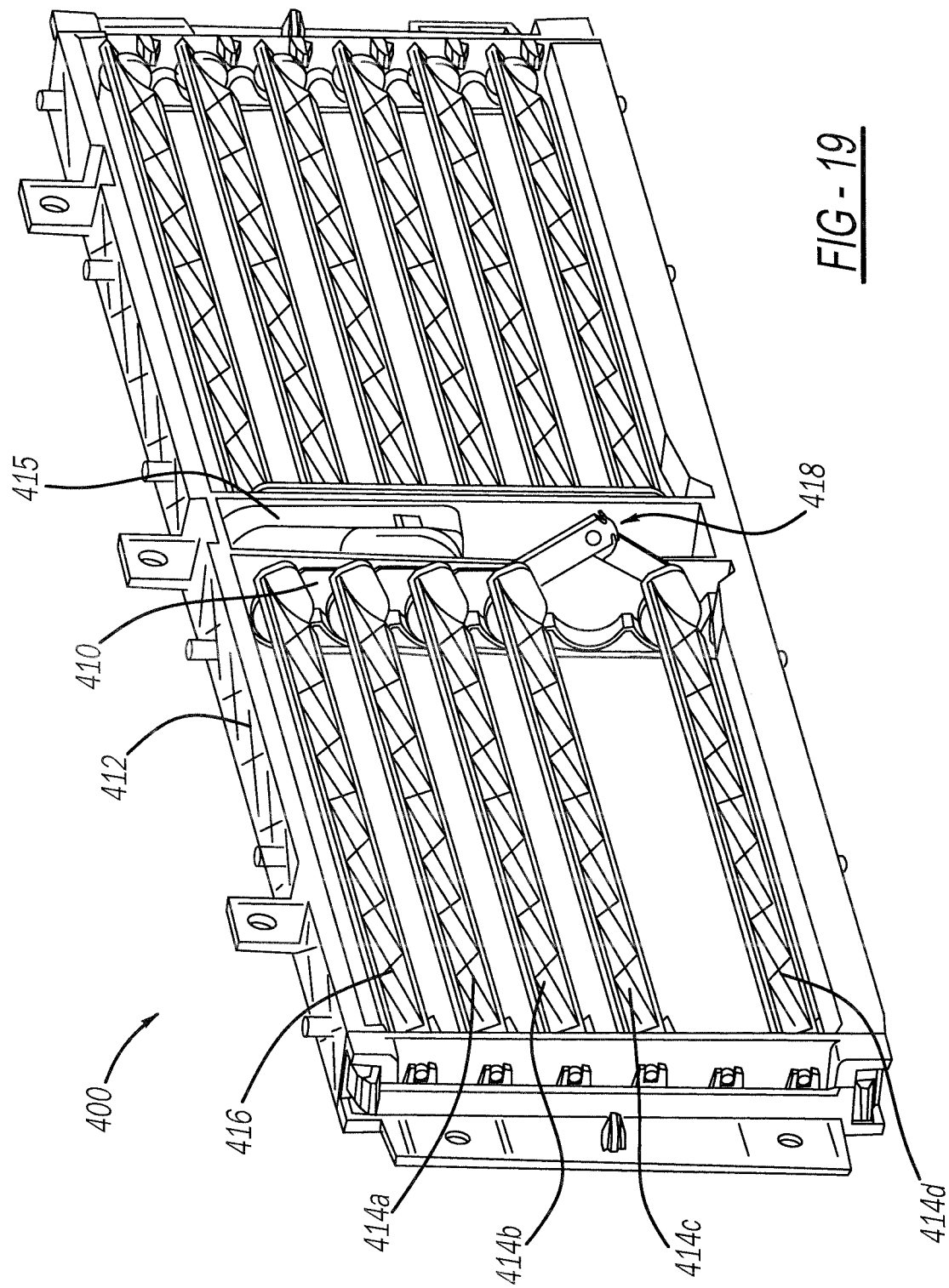
FIG. 19 is a back side perspective view of an active grill assembly showing a kinematic connection rod assembly installed the active grill assembly.

Referring now to FIGS. 6 and 7, in-mold assembling includes forming first at least one first body portion, which includes the first end portion 12, second end portion 13, middle portion 14 and at least one second body portion, preferably shown as the plurality of second body portions 16, 16'. The second body portions 16, 16' are shown for connecting the middle portion 14 with the first end portion 12 and second end portion 13. Thus, the second body portions 16, 16' are connecting members molded in the second shot to connect the first body portions together and provide a one piece, but frangible, connecting rod assembly. In a first molding step, the first material is injected into the molding cavity for forming the first body portions 12, 13, 14. The second material is injected into the second molding cavity, (e.g., when the first material is still being injected and/or is still molten), for forming the plurality of second body portions 16, 16' (e.g., connecting links) directly adjacent to the first body portions 12, 13, 14. Accordingly, the first material of the first body portions 12, 13, 14 abuts and is in contact with the second material used for the second body portions 16, 16'. At the interface of the surface contact between the first and second materials a frangible bond is formed at this interface. The materials used and design of the interfaces between the parts is engineered to be frangible and allow rotation between the members if one of the vanes is missing or damaged in the system as seen in FIGS. 5 and 19. The first and second materials are either the same or dissimilar materials selected because of their ability to provide a frangible bond at the mating surfaces during a two shot molding process. While the first members are shown as molded in a first step of a two-step process with the second members 14 in the second step, provided the parts are designed properly, the order of molding of the parts can be reversed or also co-injection of the first and second materials are contemplated without departure from the scope of the present invention.

Referring now to FIGS. 8 and 9, the frangible connections 25a, 25b are shown in cross section in more detail. As shown in FIG. 8 the first end portion 12 has a thinner portion 23 designed to make room for a thinner portion 26 of the second body portion 16 (FIG. 9) so the thickness of the kinematic connection rod assembly is uniform in both the first end portion 12, second body portion 16 and at the frangible connections 25a, 25b once formed. The thinner portion 23 is molded with an aperture 28 which is oversized and has a section in which the aperture is wider on the side 30 than the side 32 to allow for removal of the part from the mold. After molding this part a second mold is used for forming the second body portion 16' as shown in FIG. 9. When molding the second body portion 16' the mold is designed such that thinner portion 26 overlaps and abuts the surfaces 34a and 34b along with the surfaces forming aperture 28. A wall of material or neck 29 is formed at aperture 28 and a new aperture 36 is formed in the proper size for assembly with the vanes 200a-f. The new aperture 36 is formed with a radially wider dimension at the side 32 than the other side 34 in order to allow for mold removal of the pin that the aperture 36 is molded around. This configuration allows for molding of the aperture without requirement of any tooling action. In FIG. 7 there are other frangible connections 25c-25g that are similar connections to the one shown in FIGS. 8 and 9, with the only difference being that the frangible connections 25a-25g are connection made between ends of the second body portions 16, 16' and the respective ends of the second end portion 13 or middle portion 14.

Figure 10:
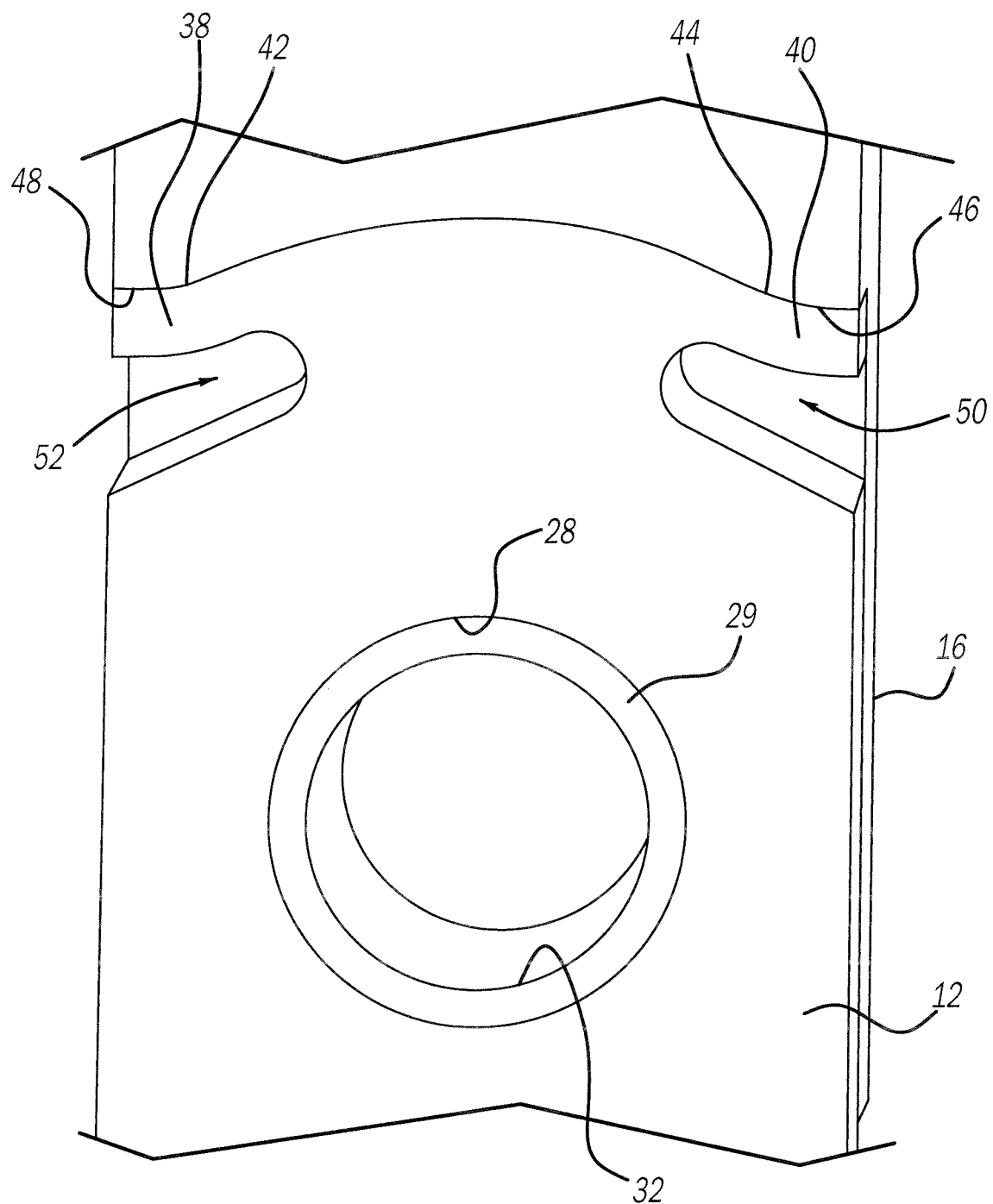
FIG. 10 is a perspective detailed view of a frangible connection.

FIG. 10 (and in FIGS. 6 and 7) is an enlarged plan view of frangible connection 25b. The elements shown in FIG. 10 are also present in the other frangible connections 25a, 25c-25g shown in FIG. 7. The frangible connection is formed with engagement tabs 38, 40 which are formed to have surfaces 42, 44 for engaging surfaces 46 and 48 of the first end 12 to provide interference for holding the member in a one piece during normal assembly and operation of the vanes and allowing frangibility for pivoting at the aperture. Openings 50, 52 are adjacent the engagement tabs 38, 40 allow the engagement tabs 38, 40 to flex and bend into the openings 50, 52 upon failure of the frangible connection 25.

Figure 11:
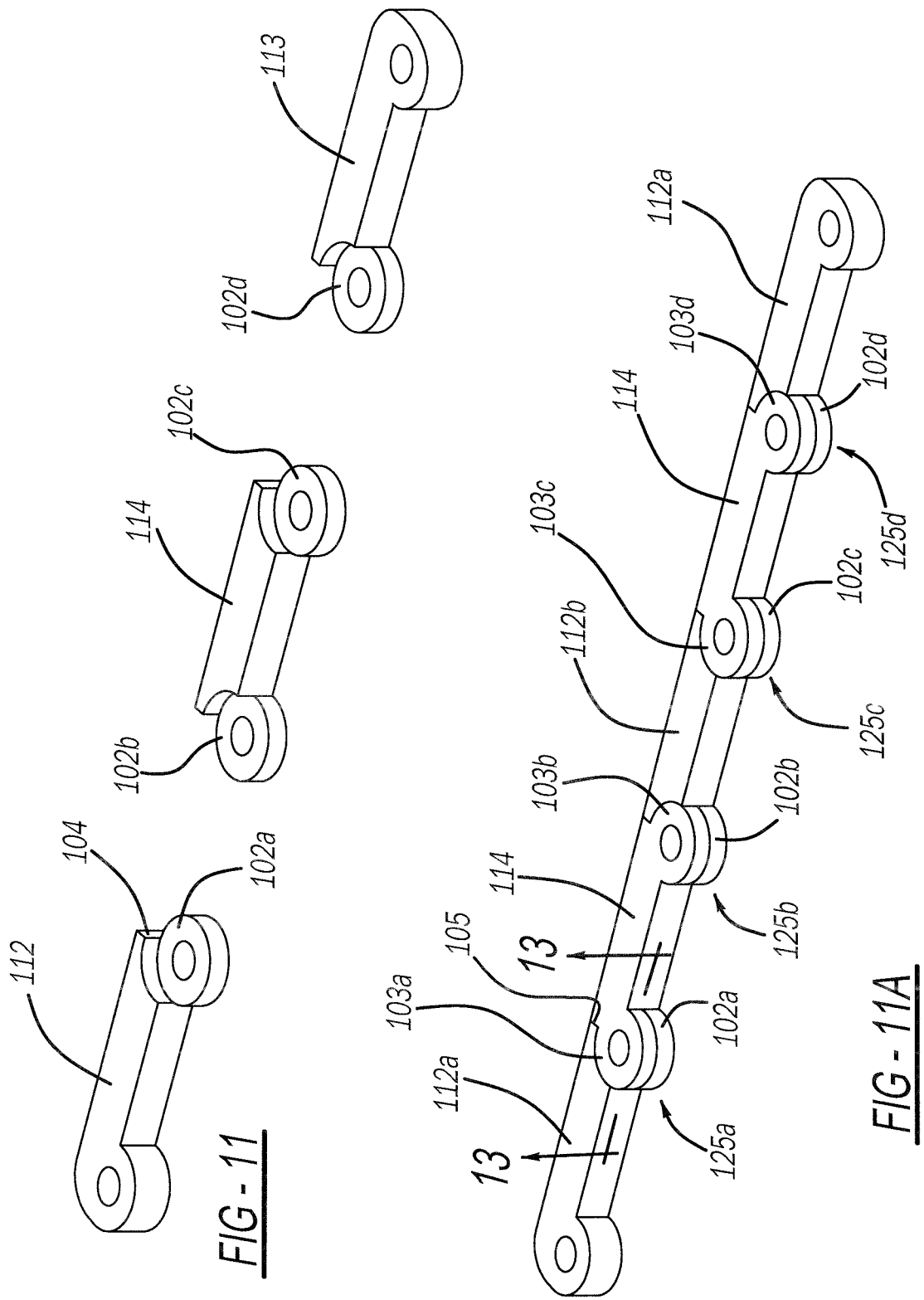
FIG. 11 is a schematic front perspective view of an alternative embodiment depicting first body portions formed by a first shot of molten material has been injected.
Figure 12:
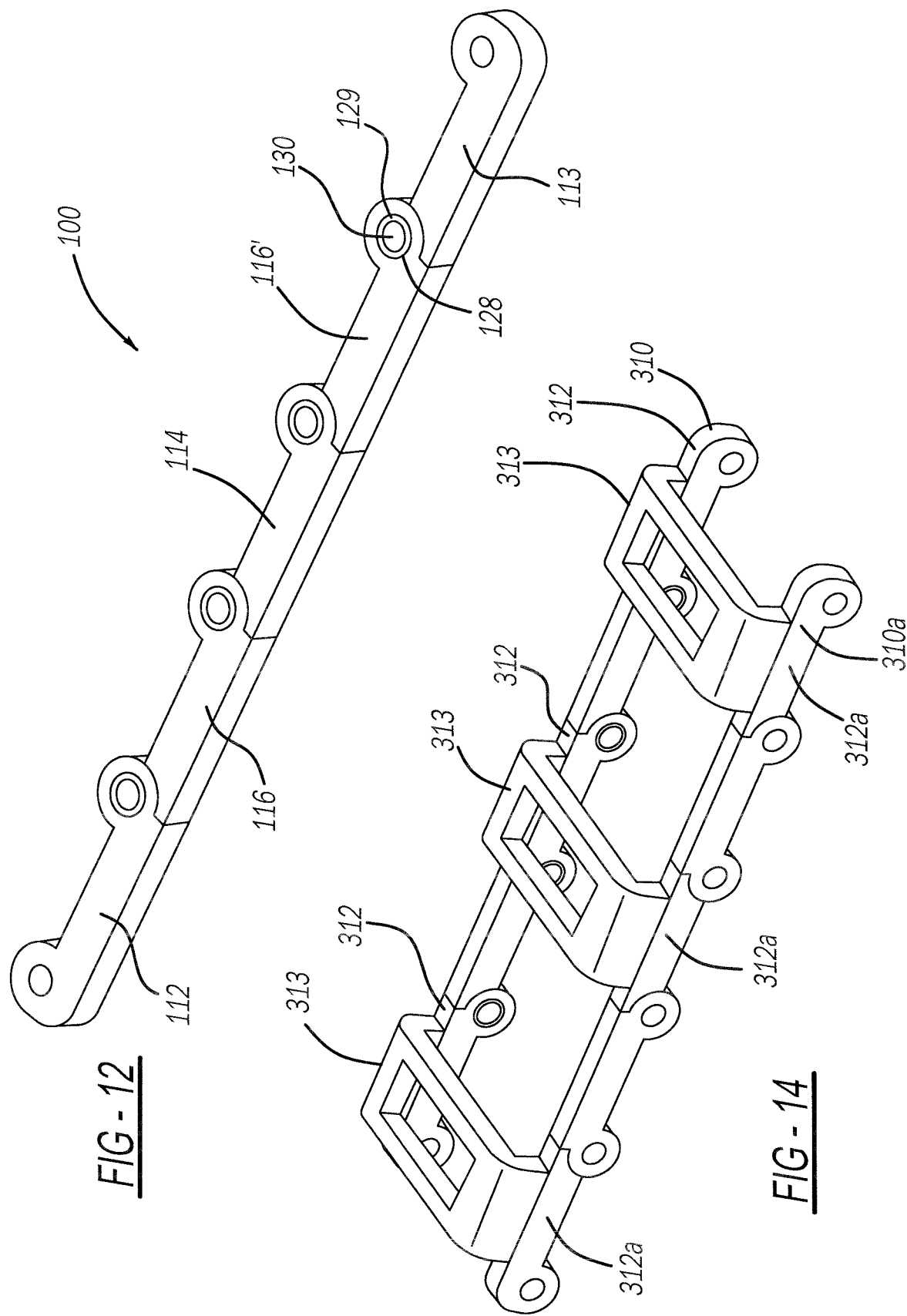
Figure 13:
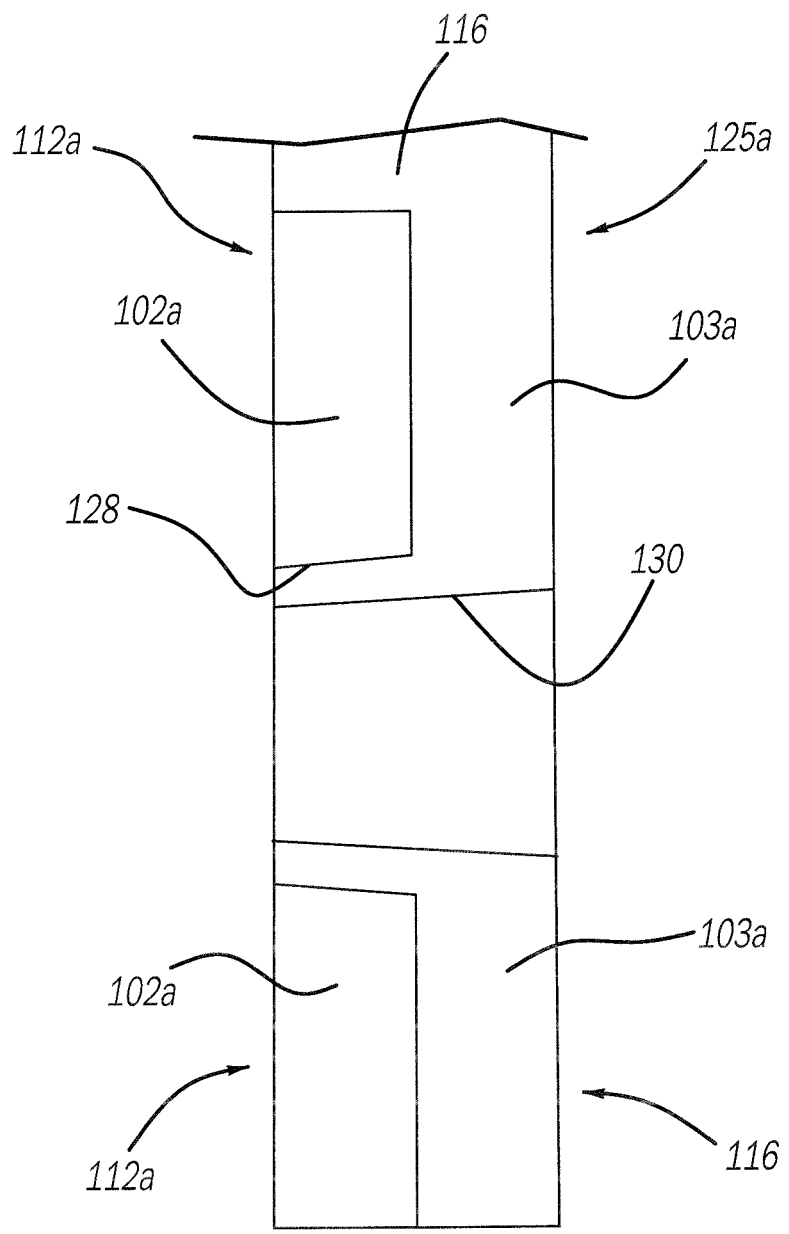
FIG. 13 is a plan side section view showing the first shot and second shot of the present invention.

Referring now to FIGS. 11, 11*a* and 13, there is shown an alternate embodiment of the kinematic connection rod assembly 100 where the tabs 36, 38 shown in FIG. 10 are not included. In this embodiment the first body portions include first end portion 112, second end portion 113 and middle portion 114, each having end tabs 102*a*-102*d* with apertures and second body portions 104, 104' each having end tabs 103*a*-103*d* with apertures that are formed in alignment with apertures end tabs 102*a*-102*d* during formation of the kinematic connection rod assembly 100 for form frangible connections 125*a*-125*d*. The first body portion 112 includes a first body stop ledge 104 that is configured to rest against a second body stop ledge 105 on the second body portion 116. The first body stop ledge 104 and second body stop ledge 105 ensure that the first body portion 112 and second body portion 116 will only pivot in one direction at the frangible connection 125*a*. Similar first body stop ledges and second body stop ledges are present on other first body portions (i.e., second end portion 113 and middle portion 114) and on both ends of second body portions 116, 116'. In FIG. 11 during a first shot injection molding step is shown and the second shot is illustrated in FIG. 11*a*. FIG. 13 shows a cross section of the frangible connection 125*a*, which includes an aperture 128 formed by through the aligned end tab 102*a* and end tab 103*a*. During molding of the second shot a neck 129 of the end tab 103*a* of the second body portion 116 to form a new aperture 130. The apertures 128 and 130 are again designed for allowing proper draft with the taper sloping from a first narrower side to a second wider side.

FIGS. 14 and 15 shown an alternate embodiment of the present invention showing a pair of control rods 310 and 310*a* which include an offset linkage 313 which connects the first linkage members 312 to the second linkage members 312*a*. The offset linkage 313 and first members 212 and 212*a* are molded in the first shot in this example. This embodiment provides improved clearance to the vane pivots and frame of the AGS assembly. Referring now to FIG. 15, the draft is set up so both sides of the two sided bridged assembly are pulled to the outside. Thus the openings are configured with the apertures tapering from narrower on the inside 332 to wider on the outside 334.

FIG. 19 depicts an active grill assembly 400 with a kinematic control rod assembly 410 according to the one embodiment of the present invention. Typically these assemblies include a frame 412. A series of driven vanes 414*a*-*d* are pivotally connected in the frame 412 and are connected to the kinematic control rod assembly 410. An actuator 415 is connected to actuate movement of a control vane 416, which moves driven vanes 414*a*-*d* by transferring drive forces through the kinematic control rod assembly 410. On the left side of the active grill assembly 400 shown in FIG. 19 there is a missing vane, which could also be a broken or non-functional vane. If there is a non-functional vane, a buckled frangible connection 418 on the kinematic active control rod 410 buckles and causes the actuator 415 to overdrive and sense a problem with the active grill assembly 400.

Referring to the figures generally, at least the contact surface(s) of the second body portion and the first body portion are of materials selected so that the body portions will adhere to one another for operation of the vane assembly with all vanes installed. However, when a vane is missing from the assembly, the second body portion will rotate relative to the first body portion indicating that there is a missing vane member. Material selections and geometric design selections are chosen to allow breakaway at the mating surfaces if a vane is missing.

Materials used in molding two shot linkage assemblies include PA (nylon) PPA (Poiyphthalamide) resins, with a second shot of POM (Polyoxymethylene) or PBT (Polybutylene terephthalate); it is also within the scope of the present invention to mold the first and second shots with the same materials. Preferably this is accomplished with materials which are semi-crystalline (such as PA or PPA), but the friction between the components is higher, and the hygroscopic properties of PA6 could cause the joints to swell, and create even higher friction.

Typically, materials used are either a glass-filled PA6 or PPA nylon material in the first shot, and a POM material (with or without glass content) in the second shot.

Nylons useful in the present invention are glass filled generally in a range of about 25-35%; typically about 28-34% filled and preferably about 30-33% glass filled (by weight). And POM and PBT materials useful in the present invention are generally from about 0 to about 30% glass filled; typically from about 15-25% glass filled; and, preferably about 20% glass filled (19%-21%) by weight.

The Nylons used are typically 30-33% glass filled; the POM materials vary between unfilled and 30%, but seemed to work best in the 20% range. Unfilled POMs are also within the scope of the present invention and are preferably used with a lubrication additive.

The use of molding PA6 or PPA materials in both $1^{st}$ and $2^{nd}$ shots is useful in the present invention, since the semi-crystalline nature of these materials doesn't allow the second shot to bind onto the first shot. However, in tests, this generated more friction than the assemblies with POM as a second shot.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A kinematic control rod assembly comprising:
   a plurality of first body portions formed of a first material;
   a plurality of second body portions formed of a second material different from the first material, and
   a plurality of frangible connections each having an opening for connecting the kinematic control rod assembly to one of a plurality of moveable members, each one of the plurality of frangible connections is formed between one of the plurality of first body portions and one of the plurality of second body portions, wherein the plurality of first body portions and the plurality of second body portions are moveable in a synchronized movement during normal operation and upon a fault condition one or more of the plurality of first body portions and one or more of the second body portions buckles at one or more of the plurality of frangible connections upon failure of the one or more of the plurality of frangible connections, thereby providing a tactile indication of the fault condition.

2. The kinematic control rod assembly of claim 1 wherein the plurality of moveable members are a plurality of vanes connected to said kinematic control rod assembly at the plurality of openings, wherein the kinematic control rod assembly moves as a solid one piece element when all of the plurality of vanes are present and the control rod will buckle at a pivot point located at one or more of the plurality of frangible connections when one or more of the plurality of vanes is missing or broken.

3. The kinematic control rod assembly of claim 2 wherein the kinematic control rod assembly is molded by a two-step mold process where the plurality of first body portions are formed from a first material and the plurality of second body portions are formed from a second material different from the first material, wherein the first material and second material provide a weak bond to hold linear operational rigidity of the kinematic control rod assembly when connected to the plurality of vanes, but allow the pivot point to buckle.

4. The kinematic control rod assembly of claim 1 wherein each one of the plurality of frangible connections includes a thinner section of the first body portion and a thinner portion of the second body portion, where the thinner portion of the first body portion has engagement tabs with an opening adjacent each engagement tab and the second body portion has engagement tabs with an opening adjacent each engagement tab, wherein the engagement tabs provide rigidity to the kinematic control rod assembly during the normal operation and upon failure of the one of the plurality of frangible connections, the engagement tabs of the first body portion and the engagement tabs of the second body portion will flex and bend into the respective openings allowing the first body portion and second body portion to pivot with respect to each other.

5. The kinematic control rod assembly of claim 1 further comprising:
   wherein the plurality of first body portions include a first body stop ledge adjacent at least one end tab and the at least one end tab has an aperture and the plurality of second body portions at each end have a second body stop ledge adjacent an end tab and the end tab has an aperture;
   wherein one of the plurality of frangible connections is formed by aligning the aperture and one of the at least one end tab of the first body portion with the aperture and end tab at one end of the second body portion and abutting the first body stop ledge against the second body stop ledge to ensure that the first body portion and second body portion will only pivot in one direction.

6. The kinematic control rod assembly of claim 5 wherein two of said kinematic control rod assemblies are connected with at least one bridge member there between.

7. The kinematic control rod assembly of claim 6 wherein said bridge member is injection molded with said plurality of first body portions in a single mold.

8. The kinematic control rod assembly of claim 5 wherein during molding of the plurality of second body portions a neck is formed in the aperture of the end tab of the first body portion thereby creating a new aperture.

9. The kinematic control rod assembly of claim 8 wherein the apertures of the end tab of the first body portion and the new aperture each have a taper from a first side to a second side.

10. An active grill assembly having a kinematic control rod assembly comprising:
   a plurality of first body portions of the kinematic control rod assembly, the plurality of first body portions being formed of a first material;
   a plurality of second body portions of the kinematic control rod assembly, the plurality of second body portions being formed of a second material different from the first material, and
   a plurality of frangible connections of the kinematic control rod assembly, each having an opening for connecting the kinematic control rod assembly to one of a plurality of moveable members, each one of the plurality of frangible connections is formed between one of the plurality of first body portions and one of the plurality of second body portions;
   a frame of the active grill assembly including a plurality of vanes and a control vane rotatably connected to both the frame and to the plurality of openings of the kinematic control rod assembly; and
   an actuator connected to the frame and connected to the control vane, wherein the actuator rotates the control vane causing the control vane to move the kinematic control rod assembly and the plurality of vanes, wherein the kinematic control rod assembly moves as a solid one piece element when all of the plurality of vanes are present and the kinematic control rod assembly will buckle at a pivot point located at one or more of the plurality of frangible connections when one or more of the plurality of vanes is missing or broken.

11. The active grill assembly of claim 10 wherein the kinematic control rod assembly is molded by a two-step mold process where the plurality of first body portions are formed from a first material and the plurality of second body portions is formed from a second material different from the first material, wherein the first material and second material provide a weak bond to hold linear operational rigidity of the kinematic control rod assembly when connected to the plurality of vanes, but allow the pivot point to buckle.

12. The active grill assembly of claim 10 wherein each one of the plurality of frangible connections includes a thinner section of the first body portion and a thinner portion of the second body portion, where the thinner portion of the first body portion has engagement tabs with an opening adjacent each engagement tab and the second body portion has engagement tabs with an opening adjacent each engagement tab, wherein the engagement tabs provide rigidity to the kinematic control rod assembly during the normal operation and upon failure of the one of the plurality of frangible connections, the engagement tabs of the first body portion and the engagement tabs of the second body portion will flex and bend into the respective openings allowing the first body portion and second body portion to pivot with respect to each other.

13. The active grill assembly of claim 10 further comprising:
   wherein the plurality of first body portions include a first body stop ledge adjacent at least one end tab and the at least one end tab has an aperture and the plurality of second body portions at each end have a second body stop ledge adjacent an end tab and the end tab has an aperture;
   wherein one of the plurality of frangible connections is formed by aligning the aperture and one of the at least one end tab of the first body portion with the aperture and end tab at one end of the second body portion and abutting the first body stop ledge against the second body stop ledge to ensure that the first body portion and second body portion will only pivot in one direction.

14. The active grill assembly of claim 13 wherein two of said kinematic control rod assemblies are connected with at least one bridge member there between.

15. The active grill assembly of claim 14 wherein said bridge member is injection molded with said plurality of first body portions in a single mold.

16. The active grill assembly of claim 13 wherein during molding of the plurality of second body portions a neck is formed in the aperture of the end tab of the first body portion thereby creating a new aperture.

17. The active grill assembly of claim 16 wherein the apertures of the end tab of the first body portion and the new aperture each have a taper from a first side to a second side.

18. A process for in mold injection molding of a kinematic control rod assembly comprising the steps of:
- a. Providing a two shot molding tool having a first molding cavity for forming a plurality of first body portions of a linkage assembly, having one of a male or female hinge member;
- b. Providing a second molding cavity for forming a cooperating second body portion for connecting with first body portions which molds into and/or around the hinge portions of said one of said male or female hinge member for forming the other and cooperating portion of said male and female hinge member and connecting between respective pairs of first body portions;
- c. Using said first molding cavity to form said first body portion from a first injection moldable material in said cavity and there after changing said molding cavity to said cooperating second molding cavity with said first body portion maintained in said cooperating second molding cavity; and
- d. Using a second material that will be compatible to at least form a frangible bond with said first injection molding material, forming said cooperating second body portion of said assembly, where by a completed hinged assembly is realized which will function as a control rod for a series of moveable members but will buckle at one of the pivot points if one of the moveable members is absent.

19. The process of claim 18 wherein the first material has a higher melting point than the second material.

20. The process of claim 18 wherein a kinematic control rod assembly for actuation of vanes of an active grill assembly is formed by said process.

21. The process of claim 18 wherein the first and second materials are either the same or dissimilar materials selected because of their ability to provide a frangible bond at the mating surfaces during a two shot molding process.

* * * * *